US 12,273,919 B2

(12) United States Patent
Ljung (10) Patent No.: US 12,273,919 B2
(45) Date of Patent: Apr. 8, 2025

(54) METHODS FOR DETERMINING A CHANNEL OCCUPANCY TIME AND RELATED WIRELESS NODES (71) Applicant: Sony Corporation, Tokyo (JP)

(72) Inventor: Rickard Ljung, Helsingborg (SE)

(73) Assignee: Sony Corporation, Tokyo (JP)

( * ) Notice: Subject to any disclaimer, the term of this patent is extended or adjusted under 35 U.S.C. 154(b) by 488 days.

(21) Appl. No.: 17/276,108

(22) PCT Filed: Sep. 12, 2019

(86) PCT No.: PCT/SE2019/050859
§ 371 (c)(1),
(2) Date: Mar. 12, 2021

(87) PCT Pub. No.: WO2020/067957
PCT Pub. Date: Apr. 2, 2020

(65) Prior Publication Data
US 2022/0039159 A1    Feb. 3, 2022

(30) Foreign Application Priority Data
Sep. 27, 2018  (SE) .................................... 1851156-8

(51) Int. Cl.
*H04W 74/08*     (2024.01)
*H04W 24/10*     (2009.01)
(Continued)

(52) U.S. Cl.
CPC ....... *H04W 74/0816* (2013.01); *H04W 24/10* (2013.01); *H04W 72/0446* (2013.01); *H04W 74/0866* (2013.01)

(58) Field of Classification Search
CPC ............ H04W 74/0816; H04W 24/10; H04W 72/0446; H04W 74/0866; H04W 74/0808;
(Continued)

(56) References Cited

U.S. PATENT DOCUMENTS 9,801,187  B1      10/2017  Zhou
11,540,254 B2 *    12/2022  Bang .................. H04W 72/0446
2014/0031054 A1 *   1/2014  Zou ................... H04W 74/0891
                                                   455/452.2

(Continued)

FOREIGN PATENT DOCUMENTS

CN      106161292 A      11/2016
JP      2009049869 A      3/2009
(Continued)

OTHER PUBLICATIONS

Broadcom Limited: "Discussion on LAA Paused COT and UL Traffic Multiplexing"; 3GPP TASG-RAN WG1 Meeting 85; R1-165318; dated May 2016; 7 pages.
(Continued)

*Primary Examiner* — Candal Elpenord
(74) *Attorney, Agent, or Firm* — Tucker Ellis LLP (57) ABSTRACT

A method, performed at a first wireless node, for determining a channel occupancy time, COT, of the first wireless node on a radio channel is disclosed. The method comprises obtaining a radio condition parameter indicative of a condition of the radio channel; and determining the channel occupancy time based on the radio condition parameter.

20 Claims, 3 Drawing Sheets (51) Int. Cl.
*H04W 72/04* (2023.01)
*H04W 72/0446* (2023.01)
*H04W 74/0816* (2024.01)

(58) Field of Classification Search
CPC . H04W 28/0236; H04W 72/02; H04W 72/12; H04W 72/54; H04W 24/08; H04W 84/12
USPC .................................................. 370/329–330
See application file for complete search history.

(56) References Cited

U.S. PATENT DOCUMENTS

| | | | | |
|---|---|---|---|---|
| 2017/0156075 | A1 | 6/2017 | Harada | |
| 2018/0310039 | A1 | 10/2018 | Souche | |
| 2018/0310339 | A1* | 10/2018 | Li | H04W 74/0808 |
| 2018/0368090 | A1* | 12/2018 | Kadambar | H04W 8/005 |
| 2018/0376512 | A1* | 12/2018 | You | H04W 72/21 |
| 2019/0053274 | A1* | 2/2019 | Kim | H04L 5/0044 |
| 2020/0163117 | A1* | 5/2020 | Jiang | H04W 16/14 |
| 2020/0280859 | A1* | 9/2020 | Kim | H04W 16/14 |
| 2021/0385855 | A1* | 12/2021 | Talarico | H04W 76/27 |

FOREIGN PATENT DOCUMENTS

| | | | |
|---|---|---|---|
| KR | 20170111643 | A | 10/2017 |
| KR | 20180057755 | A | 5/2018 |
| WO | 2010023601 | A2 | 3/2010 |
| WO | 2015146340 | A1 | 4/2017 |
| WO | WO-2017113471 | A1 | 7/2017 |
| WO | 2018033197 | A1 | 2/2018 |
| WO | WO-2018059179 | A1 | 4/2018 |

OTHER PUBLICATIONS

International Search Report and Written Opinion from corresponding International Application No. PCT/SE2019/050859, mailed on Nov. 11, 2019, 15 pages.

Intel Corporation, "On the NR-unlicensed frame structure," 3GPP TSG RAN WG1 Meeting #95, R1-1812479, Nov. 12-16, 2018, 7 pages.

Office Action with Search Report from corresponding Swedish Application No. 1851156-8, Apr. 15, 2019, 8 pages.

* cited by examiner

METHODS FOR DETERMINING A CHANNEL OCCUPANCY TIME AND RELATED WIRELESS NODES

BACKGROUND

In wireless communications systems, such as Third Generation Partnership Project, 3GPP, systems with operations in the unlicensed band, there is a limitation on the duration of usage of the channel, by a wireless device, after starting a transmission. This is also related to channel access regulations for usage of unlicensed bands. Once a device (e.g. a base station or a user equipment, UE) has gained access to the channel via a clear channel assessment, CCA, or listen before talk, LBT, approach, the regulations stipulate a maximum time during which the device can use the channel, entitled Maximum Channel Occupancy Time, MCOT.

One example can be given for the regulations in Europe for the usage of the 5 GHz band. As specified by the standard ETSI EN 301 893 V1.7.0 for 5 GHz band usage, the total time that an equipment or device makes use of an Operating Channel is the Maximum Channel Occupancy Time, after which the device shall perform the CCA procedure. Consecutive sequence of transmissions by the equipment or the device, without it performing a new clear channel assessment, CCA, shall not exceed the Maximum Channel Occupancy Time.

In other words, each time, a device is required, due to the regulated MCOT, to end a transmission for releasing the radio channel for potential other devices to transmit, a new clear channel assessment is required to access the channel again.

Thus, from the individual device perspective, the longer the device can use the channel, the better. However, there is be trade off with respect to other devices that also want to use the channel, since other devices cannot access the channel during the Channel Occupancy Time, COT, of the transmitting device.

SUMMARY

Accordingly, there is a need for methods and wireless nodes which overcome, mitigate or alleviate the shortcomings mentioned in the background and thereby enable a dynamic determination of the channel occupancy time at the wireless node.

A method, performed at a first wireless node, for determining a channel occupancy time, COT, of the first wireless node on a radio channel is disclosed. The method comprises obtaining a radio condition parameter indicative of a condition of the radio channel; and determining the channel occupancy time based on the radio condition parameter.

The present disclosure relates to a wireless node comprising a processor module, a memory module, and a wireless interface, wherein the wireless node is configured to perform any of the methods disclosed herein.

It is an advantage of the present disclosure that a channel occupancy time is determined dynamically to adapt to the radio condition(s). This leads to an improved channel usage, and to a reduced overall interference level (and thereby to an improved coexistence in the unlicensed band). The present disclosure may advantageously also provide an improved power consumption at the first wireless node as un-necessary CCA procedures by the first wireless node are avoided.

The present disclosure may advantageously also provide an improved allocation of shared channel resources amongst a plurality of wireless nodes.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The regulations specify a Maximum Channel Occupancy Time, MCOT during which the device or wireless node can use the channel and upon which expiry the wireless node is to release the channel resources or radio channel. If the wireless node wishes to resume transmission, the wireless node is required to re-perform a clear channel assessment to access the channel again. A clear channel assessment refers to a mechanism used by a wireless node to identify other transmissions in the channel, typically via an energy detection methodology or energy detect procedure. The regulations may specify one or more energy detection thresholds to use for CCA and other requirements on procedures for when and how long time the wireless node needs to perform the energy detection.

There may be envisaged that several CCA procedures may be determined by regulations, where different CCA procedure may provide access to different transmission opportunities. For example, a first CCA procedure can be used for shorter transmissions than the MCOT specified. Further, a second CCA procedure may be required for any wireless node to transmit on the channel sharing a channel occupancy time even if a first wireless node has performed CCA procedure to gain access to the channel. In the present disclosure, the CCA procedure which allows, according to a regulation, a wireless node to use the communication channel for the regulated MCOT, is used for illustration. The presently disclosed technique can be applicable to other CCA procedures.

In a wireless communication system using the unlicensed band according to a given regulation, the channel occupancy time for a wireless node is to be specified taking the maximum COT given by the regulations into account. A channel occupancy time for a transmission by a first wireless node in a wireless communication system can be referred to as the COT of the system for a corresponding transmission type. The 3GPP standard with unlicensed operations has defined the COTs to be used for the usage of unlicensed spectrum in the Licensed Assisted Access operation. The COT to be used by the wireless node is static for each transmission type (e.g. Uplink, UL, Downlink, DL, signal types, and/or data size). Thus, the wireless node uses the COT as its channel occupancy time, independently of the number of other nodes attempting to access the channel.

The present disclosure proposes to adapt the COT to the radio conditions experienced by the wireless node (e.g. based on a set of interference and or coexistence conditions). This way, channel resources are shared in more optimal manner and a static COT per transmission type is not always applied unconditionally.

The present disclosure proposes a technique which leads to a COT which depends on the radio channel condition and/or a performance of the system, and/or a number of additional wireless nodes attempting to use the channel, and possibly leads to a COT may adapt to these types of conditions. For example, the proposed technique may result in a shorter average COT usage when conditions indicate that there is at least one other wireless node also trying to use the channel, or when the performance of the system indicates that the transmission link or channel has a relatively poor performance. This may lead to a more optimal use of the radio resources.

The figures are schematic and simplified for clarity, and they merely show details which are essential to the understanding of the invention, while other details have been left out. Throughout, the same reference numerals are used for identical or corresponding parts.

Figure 1:
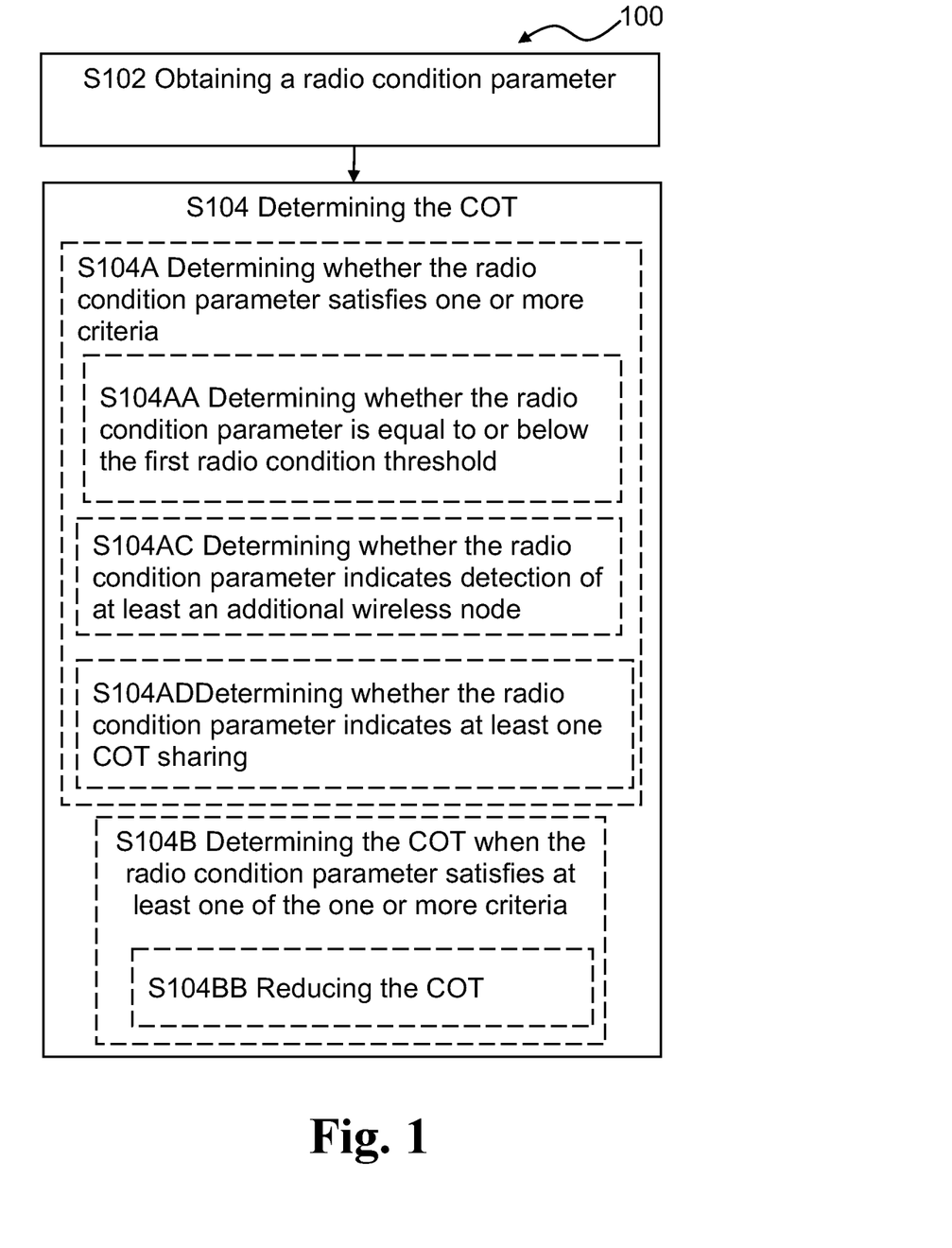
FIG. 1 is a flow diagram of an exemplary method according to the disclosure.

FIG. 1 is a flow diagram of an exemplary method 100 according to the disclosure.

The method 100 is performed at a first wireless node. The wireless node is configured to communicate with one or more wireless nodes, such as a second wireless node, and/or a third wireless node. A wireless node, such as the first wireless node, refers herein to an electronic device configured to communicate via a wireless communication system, such as IEEE Wireless Local Area Network, such as a 3GPP system, especially such as a 3GPP with operations in the unlicensed band, such as the 5 GHz band. Examples of wireless node comprise a computing device capable of wireless communications (e.g. a mobile device, a portable electronic device) and/or a network node (e.g. a base station, a Node B, an eNode B, and/or a next generation Node B, gNB, and/or an access point).

The method 100 is performed for determining a channel occupancy time, such as for adapting a channel occupancy time, COT, of the first wireless node on a radio channel. In other words, the method 100 is performed for determining a time or duration that the first wireless node occupies the radio channel (or is to occupy the radio channel).

The method 100 comprises obtaining S102 a radio condition parameter indicative of a condition of the radio channel. The radio condition parameter may refer to a parameter indicative of the radio condition in vicinity of the first wireless node. Alternatively, additionally, the radio condition parameter may refer to a parameter indicative of the radio condition in vicinity of a wireless node intended to be the receiver of an upcoming transmission. For example, the radio condition parameter may be indicative of the radio environment. For example, the radio condition parameter may be indicative of noise interference and/or coexistence condition experienced by the first wireless node or by a wireless node intended to be the receiver of an upcoming transmission. For example, the radio condition parameter may comprise one or more of: a channel condition parameter, a channel state parameter, a coexistence parameter, a noise parameter, an interference parameter, a collision parameter, a measurements parameter, an error rate (e.g. a frame error rate, a bit error rate), and a COT sharing parameter etc. The radio condition parameter may be indicative of any combinations of the examples of radio condition parameters.

The method 100 comprises determining S104 the channel occupancy time based on the radio condition parameter. For example, determining S104 the channel occupancy time based on the radio condition parameter may provide a determined channel occupancy time for e.g. a data transmission (such as e.g. Physical Downlink Shared Channel, PDSCH, transmission). For example, determining S104 the channel occupancy time based on the radio condition parameter may provide a determined channel occupancy time for e.g. a data transmission which does not exceed the MCOT specified by the regulations. To comply with the regulations for usage of unlicensed bands, the channel occupancy time is determined according to the present disclosure as a value which is equal or shorter than the MCOT which is specified by the regulations. Further, the determining of the channel occupancy time based on the radio condition parameter may result in a COT that is determined for an optimum system performance taking the radio condition(s) into account.

In one or more example methods, determining S104 the channel occupancy time based on the radio condition parameter comprises determining an allowable channel occupancy time based on the radio condition parameter. In other words, the disclosed method may limit the maximum allowed channel occupancy time for the wireless device. The channel occupancy time may be seen as a transmit time of the wireless device. It can be noted that the disclosed method provides the maximum allowed transmit time, which is different from a required transmit time. In other words, the wireless device disclosed herein is capable of determining how long time the wireless device should spend at maximum using the channel, possibly due to causing interference to others wireless devices.

Hence, it may be appreciated that a channel occupancy time is determined dynamically to adapt to the radio condition(s). This leads to an improved channel usage, and to a reduced overall interference level (and thereby to an improved coexistence in the unlicensed band).

It may be appreciated that the disclosed method allows defining a system specific channel occupancy time (COT) limitation based on environment conditions, where the conditions may be related to channel measurements or other known parameters that indicate whether other devices and/or systems are trying to use the same radio channel. Limitations may also be added based on COT sharing between two or more devices. Stated differently, the disclosed methods introduce dynamic channel occupancy time limitations for an improved system coexistence.

Obtaining S102 the radio condition parameter may be based on channel measurements, and/or energy detect procedure. The energy detect procedure refers to a mechanism used to determine the presence of another wireless node operating on the channel based on detecting the total energy level of the energy on the channel. Such energy detection procedure may therefore result in detecting that other wireless node(s) is transmitting.

Figure 3:
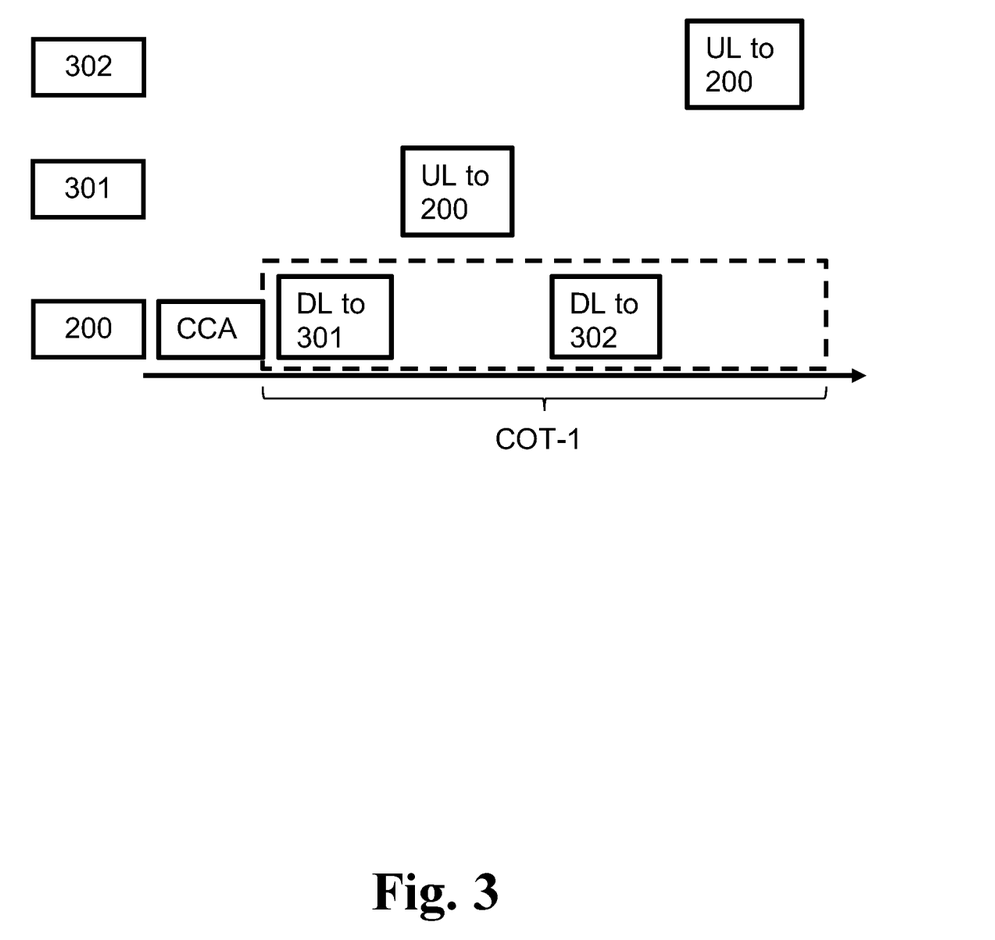

Obtaining S102 the radio condition parameter may be based on information from a control plane, e.g. an uplink control plane. The information from the control plane may include one or more of: a measurements report, a signal to interference plus noise ratio, SINR, report; an automatic repeat request, ARQ report (such as hybrid ARQ, HARQ, reports), a channel quality indicator, CQI, report. Obtaining S102 the radio condition parameter may be based on energy detection, collision detection, and/or interference detection. Obtaining S102 the radio condition parameter may be based on COT sharing with one or more additional wireless nodes. COT sharing is illustrated in FIG. 3. In one or more exemplary methods, a COT sharing parameter may be indicative of allowance of COT sharing or a number of wireless nodes that are in COT sharing with the first wireless node. COT sharing involves the following: a first wireless node which has access to the channel can communicate with a second wireless node. The first wireless is capable of sharing one or more part of its remaining (un-used) COT with the second wireless node. For example, a first wireless node (such as a base station, such as a global NodeB, gNB) can secure the channel for a COT, via CCA procedure, and then use the channel occupancy time to communicate with one or more additional wireless nodes, in uplink and/or in downlink. For example, in COT sharing (e.g. enabled by ETSI-BRAN), a first wireless node acquires a COT using an LBT procedure (e.g. CAT4 LBT) and shares the COT with a second wireless node shares using a shorter LBT procedure (e.g. a 25 us LBT with a gap) provided the amount of transmission does not exceed the MCOT. For example, it may be envisaged to perform a number of LBT procedures for multiple switching points (e.g. UL to DL switching, DL to UL switching, and/or switching between the first wireless node, and the second wireless node), e.g. a number of one-shot LBTs for a gap duration greater than 25 us, where the number of LBT procedures jointly depends on the length of the gap and the transmission duration. The present disclosure allows to provide a shared COT with multiple switching points for NR-U, and optionally to reduce the COT duration. The present disclosure allows to satisfy the requirements of fair coexistence.

In one or more exemplary methods, the radio condition parameter comprises one or more of: a measurement report, an uplink measurement report, a channel occupancy measurement, a channel quality indicator report, an automatic repeat request parameter, a parameter indicating detection of at least an additional wireless node requesting access to the radio channel, and a COT sharing parameter, and any statistics thereof. For example, the radio condition parameter comprises one or more combinations of: a measurement report, an uplink measurement report, a channel occupancy measurement, a channel quality indicator report, an automatic repeat request parameter, a parameter indicating detection of at least an additional wireless node requesting access to the radio channel, and a COT sharing parameter, and any statistics thereof. The radio condition parameter as disclosed herein allows an improved adaptation of the COT to the radio environment, to the interference level, and to the sharing of the COT.

In one or more exemplary methods, the automatic repeat request parameter may be indicative of an ARQ scheme, of a hybrid ARQ scheme. In one or more exemplary methods, the automatic repeat request parameter may be based on acknowledgement signalling of the ARQ scheme, such as reception of acknowledgement, ACK, signal, and/or reception of a non-acknowledgement, NACK, signal. In one or more exemplary methods, the automatic repeat request parameter may be indicative of the performance of the hybrid ARQ scheme. The parameter may be based on statistics of the number of successful and/or non successful transmissions over the radio channel, such as statistics of ACKs and/or NACKs over the channel.

In one or more exemplary methods, the radio condition parameter comprises an uplink, UL, measurement report from one or more wireless nodes, for example a channel occupancy measurement, statistics based on CQI report(s) and/or based on HARQ ACK/NACK.

In one or more exemplary methods, determining S104 the channel occupancy time based on the radio condition parameter comprises determining S104A whether the radio condition parameter satisfies one or more criteria. The one or more criteria may be seen as one or more trigger conditions which when satisfied, a determination of the COT to use is performed by the first wireless node (e.g. using a predetermined value based on whether the radio condition parameter satisfied the one or more criteria or not). Further, the one or more criteria may comprise one or more trigger conditions which when satisfied, an adaptation, (e.g. an adjustment, a reduction, an increase) of the COT is performed. The one or more criteria may be based on radio condition parameters indicating a radio condition satisfying at least one criterion of the one or more criteria. It may be appreciated that this allows a determination of the channel occupancy time which is dynamic and instantly determined for and/or adaptive to the radio condition(s).

In one or more exemplary methods, determining S104 the channel occupancy time based on the radio condition parameter comprises: in accordance with the determination that the radio condition parameter satisfies one or more criteria, determining S104B the channel occupancy time (e.g. using a calculation and/or using a predetermined value). This may lead to an improved channel usage, and to a reduced overall interference level (and thereby to an improved coexistence in the unlicensed band) as the COT is determined based on radio condition(s) to improve radio channel sharing and radio channel access to wireless nodes attempting to access the channel.

In one or more exemplary methods, the one or more criteria comprises a first criterion based on one or more radio condition thresholds, the one or more radio condition thresholds comprising a first radio condition threshold. The present disclosure may advantageously also provide an improved power consumption at the first wireless node as retransmissions and transmissions under poor radio condition(s) by the first wireless node are reduced.

In one or more exemplary methods, determining S104A whether the radio condition parameter satisfies one or more criteria comprises determining S104AA whether the radio condition parameter is equal to or below the first radio condition threshold, and determining S104 the COT comprises in accordance with the determination that the radio condition parameter is below the first radio condition threshold, determining S104B the channel occupancy time (e.g. to be equal to a first predetermined value). In other words, when the radio condition parameter is equal to or below the first radio condition threshold, the radio condition parameter satisfies the first criterion, and thereby satisfies the one or more criteria, and the method 100 proceeds to determining S104B the channel occupancy time, e.g. using the first predetermined value.

The first predetermined value may be an increased value or a decreased value depending on the radio condition parameter. The first predetermined value may be associated with or linked to radio condition(s) which is captured and/or detected by one or more radio condition parameters satisfying the first criterion. It may be envisaged that the first wireless node is configured to store or to associate a first predetermined value of COT with a radio condition(s) which is captured and/or detected by one or more radio condition parameters satisfying the first criterion. Accordingly, when the radio condition parameter is below the first radio condition threshold, the first wireless node can determine the channel occupancy time using the first predetermined value associated with the radio condition satisfying the first criterion.

In one or more exemplary methods, determining S104A whether the radio condition parameter satisfies one or more criteria comprises determining S104AA whether the radio condition parameter is equal to or below the first radio condition threshold, and determining S104 the COT comprises: in accordance with the determination that the radio condition parameter is not equal to nor below the first radio condition threshold, determining S104B the channel occupancy time, e.g. using a predetermined value, e.g. a second predetermined. The second predetermined value may be associated with the first criterion not being satisfied, e.g. when the radio condition parameter does not satisfy the first criterion. In other words, the first criterion is satisfied when the first radio condition threshold is equal to or below the first radio condition threshold.

In one or more exemplary methods, the first predetermined value is not equal to the second predetermined value.

In an illustrative example where the disclosed technique is applied, when the radio condition parameter obtained includes an ARQ parameter indicative of an ACK vs NACK statistic (percentage) for the last N transmissions, the first radio condition threshold may be 90%, wherein the radio condition parameter satisfies the first criterion when ARQ parameter indicative of an ACK vs NACK statistic for the last N transmissions is below or equal to 90%. Assuming the predetermined values for the COT to use in the system are e.g. 8 ms when the first criterion is met and 10 ms when the first criterion is not met: when the radio condition parameter satisfies the first criterion, the method 100 determines the COT to 8 ms and when the radio condition parameter does not satisfy the first criterion, the method 100 determines the COT to 10 ms.

In one or more exemplary methods, the one or more criteria comprises a second criterion, wherein the second criterion is satisfied when the radio condition parameter indicates detection of at least an additional wireless node requesting access to the radio channel. In other words, the second criterion is satisfied when the radio condition parameter indicates interference, e.g. that at least an additional wireless node is accessing the radio channel. For example, determining S104A whether the radio condition parameter satisfies one or more criteria comprises determining S104AC whether the radio condition parameter indicates the detection of the at least an additional wireless node requesting access to (or is accessing) the radio channel.

For example, the radio condition parameter may indicate collisions via HARQ statistics, and/or the first wireless node may have received an UL access request from the additional wireless node. For example, an energy detect procedure may result in indicating at least an additional wireless node attempting to access to (or is accessing) the radio channel This may provide an improved radio channel sharing and radio channel access to wireless nodes attempting to access the channel.

In one or more exemplary methods, determining S104 the COT comprises: in accordance with the determination that the radio condition parameter indicates detection of the at least an additional wireless node requesting access to (or is accessing) the radio channel, determining S104B the channel occupancy time, e.g. using a predetermined value, e.g. a third predetermined value for the COT. In other words, when the radio condition parameter indicates detection of the at least an additional wireless node requesting access to the radio channel, the radio condition parameter satisfies the second criterion, and thereby satisfies the one or more criteria, and the method 100 proceeds to determining S104B the channel occupancy time using the third predetermined value. The third predetermined value may be associated with or linked to radio condition(s) which is captured and/or detected by one or more radio condition parameters satisfying the second criterion.

In one or more exemplary methods, the one or more criteria comprises a third criterion, wherein the third criterion is satisfied when the radio condition parameter indicates at least one COT sharing between the first wireless node and a second wireless node. In other words, in one or more exemplary methods, determining S104A whether the radio condition parameter satisfies one or more criteria comprises determining S104AD whether the radio condition parameter indicates at least one COT sharing between the first wireless node and a second wireless node. For example, the radio condition parameter may indicate that the first wireless node performs a COT sharing with a set of second wireless nodes, wherein the set comprises one or more second wireless nodes. This may provide an improved determination of the COT of the first wireless node under COT sharing.

In one or more exemplary methods, the method comprises in accordance with the determination that the radio condition parameter indicates at least one COT sharing between the first wireless node and a second wireless node, determining S104B the channel occupancy time, e.g. by using a predetermined value, such as a fourth predetermined value. In other words, when the radio condition parameter indicates at least one COT sharing between the first wireless node and a second wireless node, the radio condition parameter satisfies the third criterion, and thereby satisfies the one or more criteria, and the method 100 proceeds to determining S104B the channel occupancy time using the fourth predetermined value. The fourth predetermined value may be associated with or linked to radio condition(s) which is captured and/or detected by one or more radio condition parameters satisfying the third criterion.

In one or more exemplary methods, any two or more of the first predetermined value, the third predetermined value, and the fourth predetermined value may not be equal depending on the radio conditions. In one or more exemplary methods, any two or more of the first predetermined value, the third predetermined value, and the fourth predetermined value may be equal depending on the radio conditions.

In one or more exemplary methods, the method comprises obtaining a radio condition parameter indicating a COT sharing with a second wireless node, and wherein determining S104 the COT based on the radio condition parameter comprises determining the COT based on the number of COT sharing occasions intended in the transmission occasion.

In one or more exemplary methods, the COT to use in a transmission occasion may be determined as a predetermined mathematical calculation where the determined COT is dependent on the number of COT sharing occasions intended in the transmission occasion.

In one or more exemplary methods, determining S104B the channel occupancy time comprises reducing S104BB the channel occupancy time. As the COT is reduced, other wireless nodes may be given access to the channel. This may provide an improved radio channel sharing and radio channel access to wireless nodes attempting to access the channel.

In one or more exemplary methods, reducing S104BB the channel occupancy time may comprise reducing the channel occupancy time, COT, incrementally based on a step parameter. In one or more exemplary methods, reducing S104BB the channel occupancy time may comprise reducing the channel occupancy time, COT, using a scaling factor.

In one or more exemplary methods, reducing S104BB the channel occupancy time may comprise reducing the channel occupancy time, COT, to a reduced value of channel occupancy time, such as to a predetermined value of the channel occupancy time, which is inferior to (less than, or smaller than) a previous value of the channel occupancy time.

In one or more exemplary methods, the method may comprise: in accordance with the determination that the radio condition parameter satisfied the one or more criteria, determining the COT by reducing S104BB the channel occupancy time. For example, reducing the COT comprises optionally reducing by a scaling factor, wherein the scaling factor is dependent (e.g. derived from, e.g. proportional) on the number of second wireless nodes in a set in COT sharing with the first wireless node.

In one or more exemplary methods, the one or more criteria may comprise an increase criterion, wherein optionally, after having reduced the channel occupancy time, the method 100 comprises determining whether the radio condition parameter satisfies the increase criterion and in accordance with the determination that the radio condition parameter satisfies the increase criterion, increasing the channel occupancy time. For example, increasing the channel occupancy time can be performed using a scaling factor, and/or incrementally with a step parameter, and/or to a predetermined value.

In one or more exemplary methods, the determining of the channel occupancy time may result in maintaining the channel occupancy time unadjusted. In one or more exemplary methods, determining S104 the channel occupancy time based on the radio condition parameter comprises: in accordance with the determination that the radio condition parameter does not satisfy the first criterion, determining the channel occupancy time to a predetermined value (e.g. resulting in a maintained value).

Figure 2:
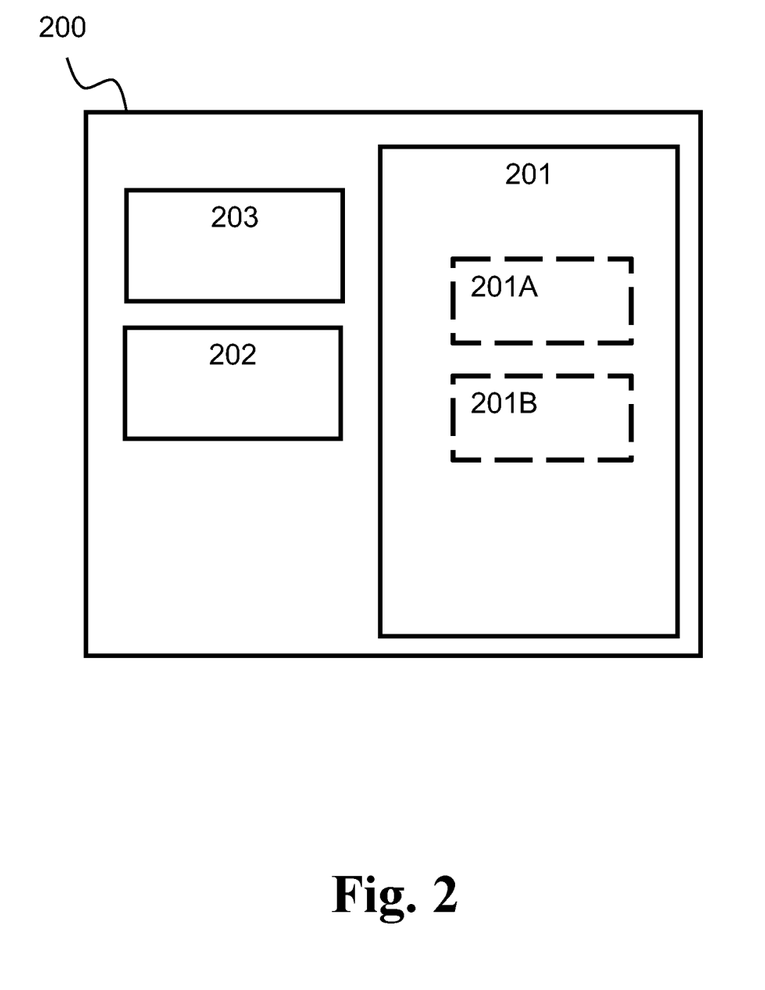
FIG. 2 schematically illustrates an exemplary device according to the disclosure, and FIG. 3 schematically illustrates COT sharing.

FIG. 2 shows a block diagram of an exemplary wireless node 200 according to this disclosure.

The wireless node 200 comprising a processor module 201, a memory module 202, and a wireless interface 203, wherein the wireless node 200 is configured to perform any of the methods disclosed herein.

The wireless interface 203 is configured for wireless communications, e.g. a 3GPP system with operations in an unlicensed band (e.g. 5 GHz band in Europe).

The processor module 201 is configured to obtain, e.g. via an obtainer module 201A, a radio condition parameter and to determine, e.g. via a determiner module 201B, the channel occupancy time based on the radio condition parameter.

The processor module 201 may be configured determine the channel occupancy time based on the radio condition parameter by determining whether the radio condition parameter satisfies one or more criteria. The one or more criteria may be seen as one or more trigger conditions which when satisfied, a determination (e.g. to a predetermined value, and/or optionally to an adapted value, and/or optionally to an adjusted value, and/or optionally to a reduced value) of the COT is performed. The one or more criteria may be based on radio condition parameters indicating a radio condition satisfying at least one criterion of the one or more criteria. It may be appreciated that this allows a determination of the channel occupancy time which is dynamic and instantly adaptive to the radio condition(s). In one or more exemplary wireless nodes, the one or more criteria comprises a first criterion based on one or more radio condition thresholds, the one or more radio condition thresholds comprising a first radio condition threshold.

In one or more exemplary wireless nodes, the one or more criteria comprises a second criterion and/or a third criterion. The second criterion is satisfied when the radio condition parameter indicates detection of at least an additional wireless node requesting access to the radio channel. The third criterion is satisfied when the radio condition parameter indicates at least one COT sharing between the first wireless node and a second wireless node.

The processor module 201 may be configured determine the channel occupancy time based on the radio condition parameter by: in accordance with the determination that the radio condition parameter satisfies one or more criteria, determining the channel occupancy time.

The processor module 201 is optionally configured to perform any of the operations disclosed in FIG. 1. The operations of the wireless node 200 may be embodied in the form of executable logic routines (e.g., lines of code, software programs, etc.) that are stored on a non-transitory computer readable medium (e.g., the memory module 202) and are executed by the processor module 201).

Furthermore, the operations of the wireless node 200 may be considered a method that the wireless node is configured to carry out. Also, while the described functions and operations may be implemented in software, such functionality may as well be carried out via dedicated hardware or firmware, or some combination of hardware, firmware and/or software.

The memory module 202 may be one or more of a buffer, a flash memory, a hard drive, a removable media, a volatile memory, a non-volatile memory, a random access memory (RAM), or other suitable device. In a typical arrangement, the memory module 202 may include a non-volatile memory for long term data storage and a volatile memory that functions as system memory for the processor module 201. The memory module 202 may exchange data with the processor module 201 over a data bus. Control lines and an address bus between the memory module 202 and the processor module 201 also may be present (not shown in FIG. 2). The memory module 202 is considered a non-transitory computer readable medium.

The memory module 202 may be configured to store radio condition parameters in a part of the memory.

The present disclosure may advantageously also provide an improved power consumption at the first wireless node as un-necessary CCA procedures by the first wireless node are avoided. The present disclosure may advantageously also provide an improved allocation of shared channel resources amongst a plurality of wireless nodes.

FIG. 3 shows a diagram illustrating COT sharing by an exemplary first wireless node 200, with an exemplary second primary wireless node 301, and an exemplary second secondary wireless node 302.

The first wireless node 200 obtains access to the channel via a CCA procedure as illustrated in FIG. 3. In the present COT sharing example, the first wireless node 200 is capable of communicating with a second primary wireless node 301 and a second secondary wireless node 302. The first wireless node 200 is configured to share one or more part of its remaining (un-used) COT with any of the second primary wireless node 301 and the second secondary wireless node 302. For example, the first wireless node 200 (such as a base station, such as a global NodeB, gNB) can secure the channel and then use the channel occupancy time, COT-1, to communicate with any of the second primary wireless node 301 and the second secondary wireless node 302, in uplink and/or in downlink.

For example, the first wireless node 200 is given COT-1 to communicate over the channel and performs COT sharing the second primary wireless node 301 and the second secondary wireless node 302, by allocating a first part of COT-1 to DL transmissions to the second primary wireless node 301, a second part of COT-1 to UL transmissions from the second primary wireless node 301, a third part of COT-1 to DL transmissions to the second secondary wireless node 302, a fourth part of COT-1 to UL transmissions from the second secondary wireless node 302.

It may be envisaged that the wireless node 200 acts as a global NodeB, and that the second primary wireless node 301 and the second secondary wireless node 302 act as user equipment communicating to the network via wireless node 200.

The disclosed technique enables an adaptation of the COT based on the number of wireless nodes in COT sharing with the first wireless node. For example, the disclosed technique enables an adjustment of the COT used by the first wireless node, such as an adjustment to a shorter COT as the number of wireless nodes using the same COT, COT-1, as the first wireless node increases, and/or as the number of switches between wireless nodes on the channel increases. This way, the first wireless node 200, the second primary wireless node 301 and the second secondary wireless node 302 can be given each given shorter dedicated individual COTs.

It should be noted that in case of an exemplary UL and/or DL switches, a short period of inactivity of the channel may be taking place. It may be envisaged that a wireless node, which shares an original COT and which is about to start a transmission according to such UL/DL switch, is configured to perform a short CCA procedure for improved coexistence while maintaining the original COT that is shared. Such a short CCA procedure is not used to gain access to the channel for a new COT, but merely for improving coexistence.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-3 comprises some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

The invention claimed is:

1. A method, performed at a first wireless node, for determining a channel occupancy time (COT) of the first wireless node on a radio channel, the method comprising:
obtaining a radio condition parameter indicative of a condition of the radio channel, wherein the radio condition parameter comprises a COT sharing parameter indicative of an allowance of COT sharing with one or more wireless devices; and
determining a time or duration that the first wireless node occupies the radio channel to share a portion of COT from the one or more wireless devices based on the radio condition parameter.

2. The method according to claim 1, wherein the determining the time or duration that the first wireless node occupies the radio channel comprises:
determining whether the radio condition parameter satisfies one or more criteria.

3. The method according to claim 2, wherein the determining the time or duration that the first wireless node occupies the radio channel comprises:
in accordance with a determination that the radio condition parameter satisfies one or more criteria, determining a channel occupancy time.

4. The method according to claim 2, wherein the one or more criteria comprises a first criterion based on one or more radio condition thresholds comprising a first radio condition threshold.

5. The method according to claim 4, wherein:
the determining whether the radio condition parameter satisfies one or more criteria comprises determining whether the radio condition parameter is equal to or below the first radio condition threshold; and
the determining the time or duration that the first wireless node occupies the radio channel comprises:
in accordance with the determination that the radio condition parameter is below the first radio condition threshold, determining a channel occupancy time.

6. The method according to claim 2, wherein the one or more criteria comprises a second criterion, wherein the second criterion is satisfied when the radio condition parameter indicates detection of at least an additional wireless node requesting access to the radio channel.

7. The method according to claim 2, wherein the one or more criteria comprises a third criterion, wherein the third criterion is satisfied when the radio condition parameter indicates at least one COT sharing between the first wireless node and a second wireless node.

8. The method according to claim 1, wherein the radio condition parameter comprises one or more of:
a measurement report;
an uplink measurement report;
a channel occupancy measurement;
a channel quality indicator report;
an automatic repeat request parameter; and/or
a parameter indicating detection of at least an additional wireless node requesting access to the radio channel.

9. The method according to claim 3, wherein the determining the time or duration that the first wireless node occupies the radio channel comprises reducing the channel occupancy time of the first wireless node.

10. The method according to claim 1, wherein the determining the COT to be used by the first wireless node comprises:
adjusting the COT to be used by the first wireless node to share the portion of the COT used by the first wireless node to one or more of:
a predetermined value;
an adapted value;
an adjusted value; and/or
reduced value.

11. The method according to claim 1, wherein the determining the COT comprises dynamically adjusting the COT to be used by the first wireless node to share the portion of the COT used by the first wireless node.

12. A wireless node comprising:
a processor module;
a non-transitory memory module storing logic; and
a wireless interface,
wherein the wireless node is configured to determine a channel occupancy time (COT) by the processor module executing the logic to:
obtain a radio condition parameter indicative of a condition of a radio channel, wherein the radio condition parameter comprises a COT sharing parameter indicative of an allowance of COT sharing with one or more wireless devices; and
determine a time that the wireless node occupies the radio channel to share a portion of COT from the one or more wireless devices based on the radio condition parameter.

13. The wireless node according to claim 12, wherein:
the processor module is operable to execute the logic to determine the channel occupancy time based on a determination that the radio condition parameter satisfies one or more criteria.

14. The wireless node according to claim 12, wherein:
the processor module is operable to execute the logic to determine the channel occupancy time based on a determination that the radio condition parameter satisfies a criterion based on one or more radio condition thresholds.

15. The wireless node according to claim 12, wherein the processor module is operable to execute the logic to:
determine whether the radio condition parameter satisfies one or more criteria by determining whether the radio condition parameter is equal to or below a first radio condition threshold; and
determine the channel occupancy time in accordance with the determination that the radio condition parameter is below the first radio condition threshold.

16. The wireless node according to claim 12, wherein:
the processor module is operable to execute the logic to determine the channel occupancy time based on the radio condition parameter indicating at least one COT sharing between the wireless node and a second wireless node.

17. The wireless node according to claim 12, wherein:
the processor module is operable to execute the logic to determine the channel occupancy time based on the radio condition parameter comprising one or more of:
a measurement report;
an uplink measurement report;
a channel occupancy measurement;
a channel quality indicator report;
an automatic repeat request parameter; and/or
a parameter indicating detection of at least an additional wireless node requesting access to the radio channel.

18. The wireless node according to claim 12, wherein:
the processor module is operable to execute the logic to dynamically determine the channel occupancy time based on the radio condition parameter.

19. The wireless node according to claim 12, wherein the processor module is operable to execute the logic to determine the COT to be used by the wireless node by:
adjusting the COT to be used by the wireless node to share the portion of the COT used by the wireless node to one or more of:
a predetermined value;
an adapted value;
an adjusted value; and/or
reduced value.

20. The wireless node according to claim 12, wherein the processor module is operable to execute the logic to determine the COT to be used by the wireless node by dynamically adjusting the COT to be used by the wireless node to share the portion of the COT used by the wireless node.

* * * * *